Patented Aug. 30, 1932

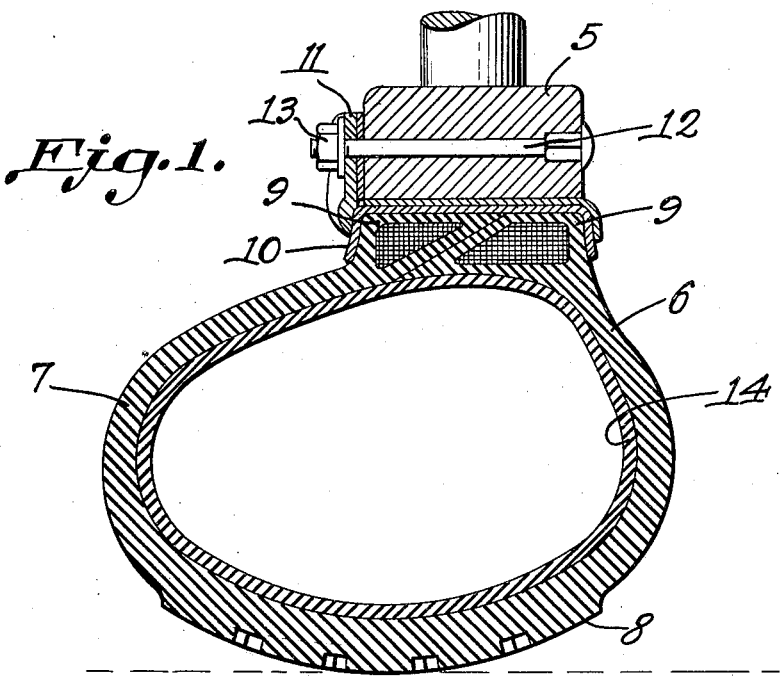
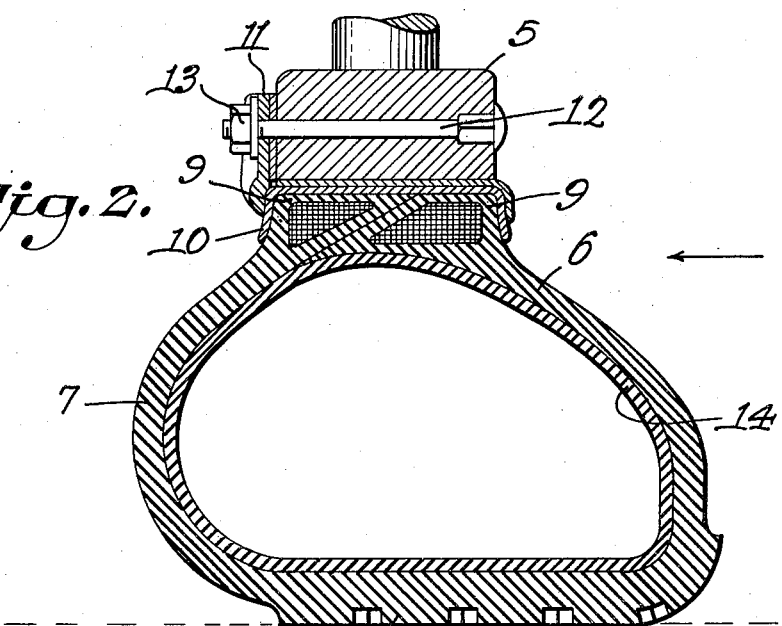

1,874,120

UNITED STATES PATENT OFFICE

JOHN WILLIAMS QUYNN, OF PARKERSBURG, WEST VIRGINIA

PNEUMATIC TIRE CONSTRUCTION

Application filed September 19, 1929. Serial No. 393,718.

This invention relates to motor vehicle tires of the pneumatic type, the primary object of the invention being to provide a tire so constructed that the traction surface thereof will be increased when the vehicle equipped with tires of this character, is rounding curves, thereby reducing the possibilities of skidding, to the minimum.

Another object of the invention is to provide a tire of eccentric design, which will move laterally, causing the body of the tire to move to a position directly under the load of the vehicle when the vehicle rounds a curve, thereby eliminating any possibility of stripping the tire from its rim.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a sectional view through a tire constructed in accordance with the invention.

Figure 2 is a sectional view through the tire illustrating the shape of the tire, due to lateral pressure exerted thereon by the shifting of the weight of the body of the vehicle in passing around curves.

Referring to the drawing in detail, the reference character 5 designates the felloe of a wheel to which a tire constructed in accordance with the present invention, is secured. As shown, the tire which is indicated by the reference character 6 has an eccentric formation in cross section providing a lateral enlargement 7, under normal conditions.

The tread of the tire is indicated by the reference character 8 and extends an appreciable distance over the outer surface of the tire proper, so that under excessive force directed to the tire, caused by lateral thrust of the vehicle body in passing around curves, the tread will flatten, increasing the traction surface of the tire, to reduce the possibilities of skidding to the minimum.

Enlargements 9 are formed at the inner side of the tire and fit within the rim 10 in the usual and well known manner, the rim being secured to the wheel as by means of the rim lugs 11 that are held in position by means of the lug bolts 12 and nuts 13 positioned on the threaded ends thereof. It will of course be understood that the tire is provided with the usual inner tube 14 that is held in position within the casing.

From the foregoing it will be obvious that when lateral pressure is directed to the outer surface of a tire such as shown by Figure 1 of the drawing, the enlargement 8 will be caused to move inwardly, centralizing the enlargement and shifting the body portion of the tire to a position directly under the load of the vehicle, to prevent stripping of the tire from the rim.

I claim:

1. In a pneumatic tire, a hollow body portion, the greater outer diameter of the body portion being offset to a radial plane passing through the mid point between the beads of the tire.

2. In a pneumatic tire, a hollow body portion, the major transverse width of the tread of said tire being laterally offset with respect to a plane passed through the mid point between the beads of the tire.

In testimony that I claim the foregoing as my own, I have hereto affixed my signature.

JOHN WILLIAMS QUYNN.